UNITED STATES PATENT OFFICE.

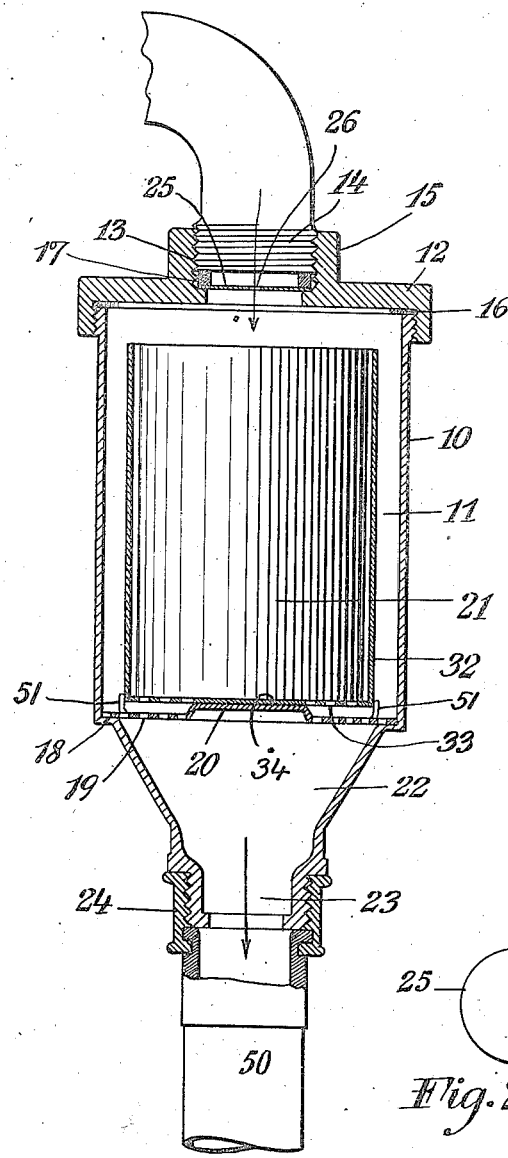
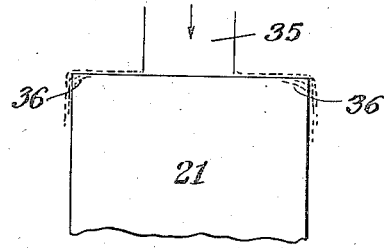
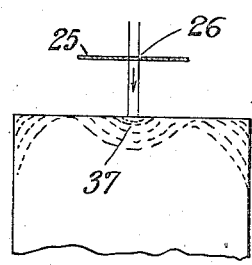
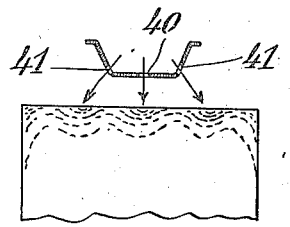
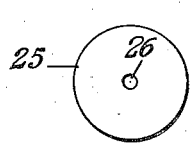
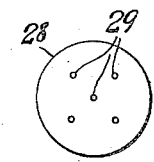
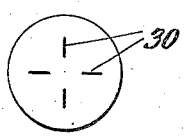

GEORG KIRKEGAARD, OF BROOKLYN, NEW YORK.

APPARATUS FOR DISTRIBUTING FERTILIZERS.

1,260,777.     Specification of Letters Patent.     Patented Mar. 26, 1918.

Application filed February 24, 1916, Serial No. 80,108. Renewed February 4, 1918. Serial No. 215,399.

*To all whom it may concern:*

Be it known that I, GEORG KIRKEGAARD, a citizen of the United States, and resident of Brooklyn, in the county of Kings and State of New York, have invented certain new and useful Improvements in Apparatus for Distributing Fertilizers, of which the following is a specification.

This invention relates to improvements in apparatus for distributing fertilizers and analogous substances. The object of the invention is to provide a novel, useful and efficient apparatus for distributing fertilizers and other similar substances which have been compressed into the form of a cartridge—for instance as described in my pending application for patent Serial Number 27,766—by subjecting the cartridge of the material to the erosive and dissolving action of a moving column of water directed toward the point of application and including novel means for increasing and adjusting the pressure of the water as hereinafter set forth.

With these and other objects in view my invention comprises an apparatus or device constructed and arranged as hereinafter set forth for the purposes referred to above, and as illustrated in the accompanying drawing in which Figure 1 is a sectional view of an apparatus embodying the invention. Figs. 2, 3 and 4 are different views of the pressure regulating element, and Figs. 5, 6 and 7 are diagrammatic views illustrating the operation and advantages of the invention.

The apparatus comprises a cylindrical casing 10 forming a receptacle 11 of uniform width throughout its length. 12 is a cover screwed onto the casing and adapted to be attached to a standard water faucet as shown (or to a garden hose between the latter and the nozzle), by means of the internally threaded inlet 13, which engages the threads 14 on the faucet (or hose coupling). 15 is a hexagonal nut for convenience in attaching the apparatus. 16 and 17 are gaskets. At the bottom of the receptacle 11 there is formed a shoulder 18 for the support of a perforated shelf 19 provided with an elevated imperforate central portion 20 upon which the cartridge 21 rests. The shelf may be secured by soldering. The casing 10 is provided with a funnel shaped bottom 22 leading to the outlet 23 which is threaded externally to receive the coupling 24 of the hose 50 (or the hose coupling where the apparatus is inserted between the hose and the nozzle).

The cartridge 21 is composed of suitable fertilizing ingredients mixed with a binder and compressed sufficiently to cause the particles to adhere and form a relatively hard cartridge, which may be handled, stored and shipped without breaking or waste, and whereby a comparatively large amount of fertilizing material may be used without requiring a large apparatus while watering. From a practical standpoint the fertilizer as an article of commerce is handled very much better when it is compressed into the form of a cartridge than when used in bulk or other forms. When the cartridge has been compressed to a density which experience has taught to be necessary for the purpose, it is too hard to be quickly dissolved by means of the ordinary water pressure available in cities and towns, and which is usually about twenty pounds pressure to the square inch. It is therefore of great utility and quite necessary to increase the pressure of the water at the inlet 13 to cause the cartridge to be dissolved quickly so that the water may carry away sufficient material for efficacious application.

I therefore provide an element to increase the pressure at the inlet 13 by restricting the volume of water flowing through it. To this end I place in the cover a disk or other means 25 having an aperture 26 adapted to restrict the volume of the water flowing through said inlet so as to increase the pressure considerably at the top of the cartridge where the water attacks the same, and which aperture 26 is relatively small as compared with the outlet 23. A further consideration in the construction and operation of my apparatus is the dimension of the nozzle outlet. As is well known, the ordinary garden hose nozzle may be adjusted from a large opening for producing a stream to a very small opening for producing a spray. This is too well known to require more than a mere statement. When the inlet and the outlet, considering as the latter either the outlet 23 or the nozzle opening, are of the same dimensions, the water flowing through the receptacle 11 moves comparatively slowly and neither the pressure nor the friction of the water in passing over the cartridge is strong enough to dissolve the latter quickly. And when the nozzle outlet is adjusted for spraying purposes, a strong back pressure is created which still further retards the movement of the water through the apparatus. Extensive experiments have proven the above statements to be true and in Figs. 5 and 6 I have shown graphically the difference in results obtained by using my apparatus without and with the element 25. In Fig. 5 a water column 35 of about the size when it leaves the faucet is shown directed upon the cartridge. It is evident that the water here flows evenly over the cartridge and dissolves the latter slowly at the edges because of the conditions set forth above, and as indicated by dotted lines 36. In Fig. 6, by the use of the disk 25, a fine, but very powerful stream of water is directed toward the center 37 of the cartridge and quickly dissolves the latter because of the greater pressure and concentrated action.

Besides serving as a pressure increasing means, the disk 25 also serves to adjust the pressure for different kinds of cartridges, and for varying the dimension of the water column and the direction thereof. Thus in Fig. 3 the disk 28 is provided with a plurality of fine openings 29. In Fig. 4 the openings are in the form of narrow slits 30, and in Fig. 7 the disk is dished and provided with a central opening 40 and side openings 41 for directing the water to attack the cartridge at different points as shown.

The raised portion of the shelf 19 provides space beneath the cartridge so that the water may also act upon the lower parts thereof. Fig. 1 shows an additional means for increasing the effect of the action of the water upon the cartridge for dissolving the latter quickly. 32 is a cylinder slightly larger than the cartridge for receiving the latter. The cylinder incloses the cartridge and is preferably of imperforate material. The cylinder 32 is provided with a bottom 33 of perforated material having an imperforate central raised portion 34. It is evident that with the cylinder 32 the cartridge dissolves very rapidly when the water is applied as shown in Fig. 6 because all the pressure is directed upon the cartridge inside the outer wall thereof, and as the material dissolves the water carries it away in passing both inside the cylinder and outside the same. The action of the water is that of coring out the cartridge with great force.

When the lower part of the cartridge is reached by the water, the perforated bottom 33 permits the impregnated water to pass off, as is obvious. The imperforate center 34 of the cylinder bottom serves to resist the direct passage of the water and compels it to spread so as to cause complete dissolution of the parts of the cartridge in the corners of the cylinder. A couple of narrow prongs 51 may be provided as centering means for the cylinder within the receptacle 11.

My invention may be embodied in various forms of construction without departing from the scope of the following claims as will be understood by those skilled in the art.

I claim:—

1. A device of the character described comprising a cylindrical casing having a water outlet and forming a receptacle, a cylinder adapted to receive the material to be dissolved, said cylinder being of less diameter than the said casing and having imperforate sides and a perforated bottom, a cover for said casing having a water inlet, means in said cover for adjusting the pressure of the water flowing through said inlet and means for supporting said cylinder centrally within the said casing and spaced a distance below said pressure regulating means to permit unobstructed access of the water to the top of the material within the cylinder.

2. A device of the character described comprising a cylindrical casing having a water outlet and forming a receptacle, a cylinder adapted to receive the material to be dissolved, said cylinder being of less diameter than the said casing and having imperforate sides and a perforated bottom, a cover for said casing having a water inlet, means in said cover for adjusting the pressure of the water flowing through said inlet, a perforated shelf secured in said casing and having a raised imperforate central portion for supporting said cylinder centrally within the casing and spaced a distance below the pressure regulating means to permit unobstructed access of the water to the top of the material within the said cylinder.

Signed at New York, N. Y., in the county of New York and State of New York this 14th day of February A. D. 1916.

GEORG KIRKEGAARD.